United States Patent
Willins et al.

(10) Patent No.: US 7,561,492 B2
(45) Date of Patent: Jul. 14, 2009

(54) SYSTEM AND METHOD FOR DETECTION USING ULTRASONIC WAVES

(75) Inventors: Bruce A. Willins, East Northport, NY (US); Richard M. Vollkommer, Smithtown, NY (US)

(73) Assignee: Symbol Technologies Inc, Holtsville, NY (US)

( * ) Notice: Subject to any disclaimer, the term of this patent is extended or adjusted under 35 U.S.C. 154(b) by 0 days.

(21) Appl. No.: 11/759,478

(22) Filed: Jun. 7, 2007

(65) Prior Publication Data

US 2007/0230271 A1    Oct. 4, 2007

Related U.S. Application Data

(63) Continuation of application No. 10/871,256, filed on Jun. 18, 2004, now Pat. No. 7,245,558.

(51) Int. Cl.
  *G01S 3/80* (2006.01)
  *G06Q 30/00* (2006.01)
(52) U.S. Cl. .................. 367/124; 235/385
(58) Field of Classification Search .......... 367/124; 235/385; 340/825.35, 825.72
See application file for complete search history.

(56) References Cited

U.S. PATENT DOCUMENTS

| 4,797,819 | A  | * | 1/1989 | Dechirot ................ 705/28 |
| 2005/0168345 | A1 | * | 8/2005 | Swafford et al. ........ 340/686.1 |
| 2005/0201826 | A1 | * | 9/2005 | Zhang et al. .............. 404/2 |

FOREIGN PATENT DOCUMENTS

JP    2003-306213 A   * 10/2003

* cited by examiner

*Primary Examiner*—Ian J Lobo

(57) ABSTRACT

Described is a system and method for detection using an ultrasonic wave. The system may include a first arrangement and a second arrangement. The first arrangement may include a transmitter and a receiver. The transmitter transmits an ultrasonic wave along a surface on which items are to be stored and the receiver receives the wave after it has passed over the surface. The second arrangement receives from the first arrangement data corresponding to properties of the received wave. The second arrangement compares the properties of the received wave to properties of the transmitted wave to generate current condition value. The second arrangement determines based on the current condition value and calibration data a current condition state corresponding to a degree of the surface currently occupied by the items. The calibration data includes at least one calibration value and a corresponding calibration condition state.

21 Claims, 3 Drawing Sheets

SYSTEM AND METHOD FOR DETECTION USING ULTRASONIC WAVES

PRIORITY CLAIM

The present application is a Continuation application of U.S. patent application Ser. No. 10/871,256 filed on Jun. 18, 2004 now U.S. Pat. No. 7,245,558 entitled "System and Method for Detection Using Ultra Sonic Waves". The entire disclosure of this application is expressly incorporated herein by reference.

BACKGROUND INFORMATION

"Stock-out" costs are those incurred by running out of a product. For example, if a customer goes to a vendor with a particular item in mind and that item is not available on the vendor's shelf, the vendor will lose that potential sale and any subsequent sales that the consumer might have made. "Stock-out" can happen if the vendor has sold all of the items, or if the vendor has sold all of the items accessible to the consumer but still has some in storage. For large vendors, the latter cause of "stock-out" can cost up to billions of dollars in lost revenue.

One potential solution to "stock-out" has been the use of radio frequency identification ("RFID") tags and RFID readers placed on shelves in stores. This solution requires that each individual item be tagged and the shelves be retrofitted with RFID readers. However, the cost of even passive RFID tags is in excess of $0.25 each, which is significantly too high to create a positive return on investment.

SUMMARY OF THE INVENTION

The present invention relates to a system and method for detection using an ultrasonic wave. The system may include a first arrangement and a second arrangement. The first arrangement may include a transmitter and a receiver. The transmitter transmits an ultrasonic wave along a surface on which items are to be stored and the receiver receives the wave after it has passed over the surface. The second arrangement receives from the first arrangement data corresponding to properties of the received wave.

The second arrangement compares the properties of the received wave to properties of the transmitted wave to generate current condition value. The second arrangement determines based on the current condition value and calibration data a current condition state corresponding to a degree of the surface currently occupied by the items. The calibration data includes at least one calibration value and a corresponding calibration condition state.

DETAILED DESCRIPTION

Figure 1:
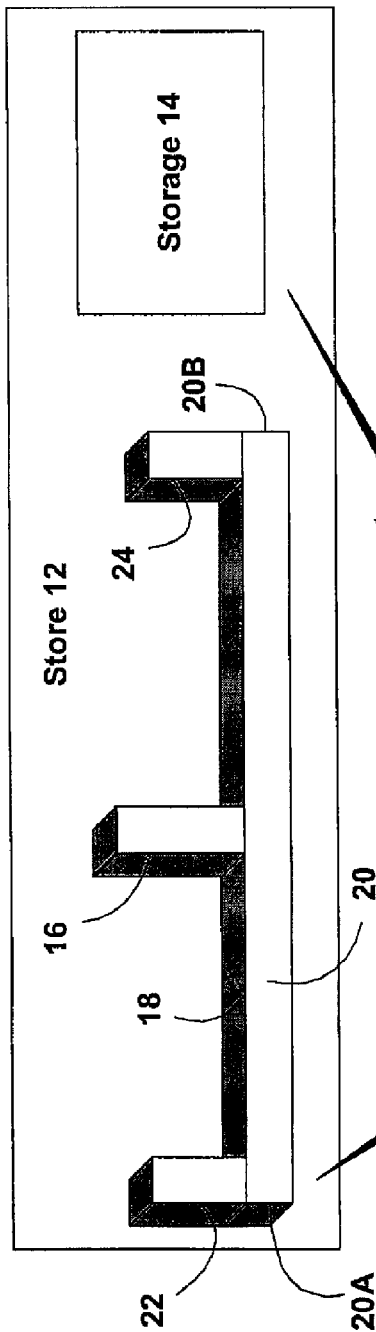
FIG. 1 shows an exemplary embodiment of a system for detection using an ultrasonic wave according to the present invention.
Figure 1:
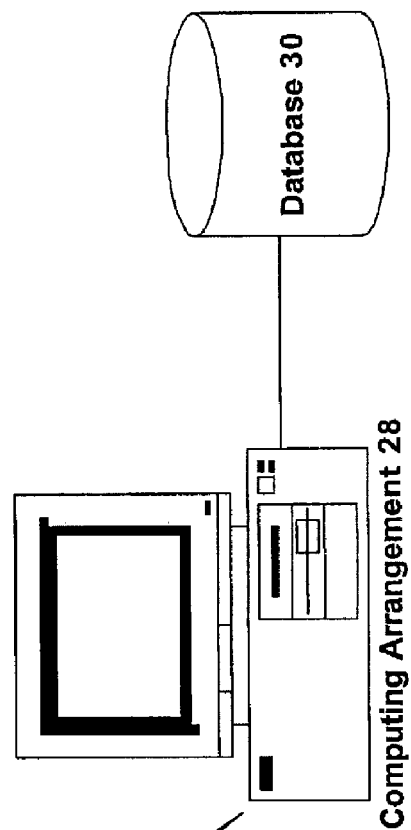

The present invention may be further understood with reference to the following description and the appended drawings, wherein like elements are provided with the same reference numerals. FIG. 1 shows an exemplary embodiment of a system 1 according to the present invention. In particular, FIG. 1 shows a store 12 and a storage 14. The store 12 may be any retail or wholesale vending establishment, of any size and/or number (e.g., franchises).

The store 12 may include a shelf 20 which has a surface 18. On the surface 18 of the shelf 20, items 16 are stored and available for viewing and purchase by a consumer. A storage facility 14, which holds overflow of the items 16, may be located within the store 12 (e.g., a stockroom) or outside of the store 12 (e.g., in an off-property warehouse or other storage facility).

The system 1 may include a first device 22 and a second device 24 which may communicate with a computing arrangement 28 (e.g., a server) via the communications network 26. The communications network 26 may be the Internet, a Wide Area Network (WAN), a Local Area Network (LAN), a wireless network, etc.

Figure 4:
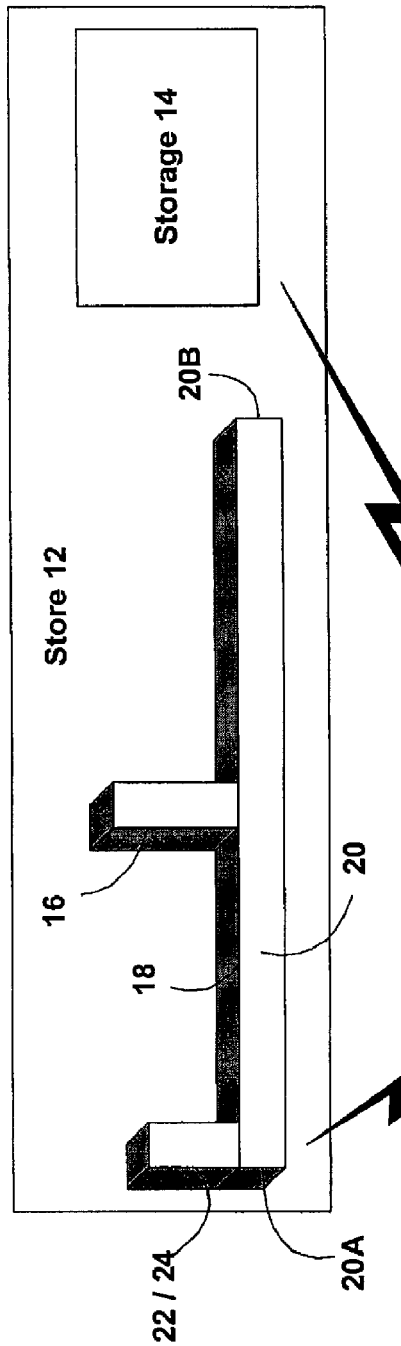
FIG. 4 shows another exemplary embodiment of the system for detection using an ultrasonic wave according to the present invention.
Figure 4:
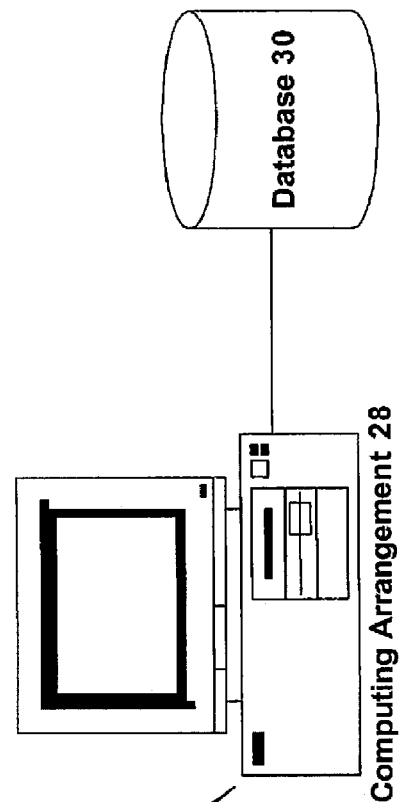

The first device 22 may be situated near a first end 20A of the shelf 20 and a second device 24 may be situated near a second end 20B of the shelf 20. In one exemplary embodiment of the present invention as shown in FIG. 1, the second device 24 may be placed opposite to the first device 22. In another exemplary embodiment of the present invention, the first and second devices 22, 24 may be situated next to each other near a particular end of the shelf 20 or combined into a single arrangement as shown in FIG. 4.

As would be understood by those skilled in the art, a plurality of the first and/or second devices 22, 24 may be situated around a perimeter of the shelf 20 (not shown). The plurality of the first and/second devices 22, 24 enable a higher degree of resolution to detect more complex states/situations/conditions. For example, if the shelf 20 is six feet long and evenly displays two different items 16 (e.g., two different brands), the plurality of the first and second devices 22, 24 may allow a detection as to which side of the shelf 20 is occupied or empty.

The first device 22 and the second device 24 may be adapted to transmit and receive an ultrasonic wave. For example, the first device 22 may be a transmitter only (e.g., a transducer) and the second device 24 a receiver only such as a sensor (e.g., an ultrasonic sensor). In operation, the first device 22 transmits the wave which propagates along the surface 18. The shelf 20 is manufactured from a material which has a known density and an acoustic velocity. As the wave encounters the items 16 placed on the shelf 20, the wave may attenuate, reflect, refract, diffract, etc. This discontinuous and reflective wave is received by the second device 24.

Properties of the received waves (e.g., amplitude, phase, etc.) along with properties of the transmitted wave are utilized to determine a current condition value. As described in more details below, the computing arrangement 28 then generates a current condition state as a function of the current condition value and a calibration data. The current condition state is indicative of a degree of the surface 18 currently occupied by the items 16. Based on the current condition state, the computing arrangement 28 may execute further actions.

In the alternative exemplary embodiment of the present invention, certain processing may be performed by the first device 22 and/or the second device 24. For example, the first and second devices 22, 24 may be programmed by the computing arrangement 28 to filter the current condition state and only report to the computing arrangement 28 when the current condition state matches to one of predetermined condition states. This allows to reduce a workload load of the computing arrangement 28.

Figure 2:
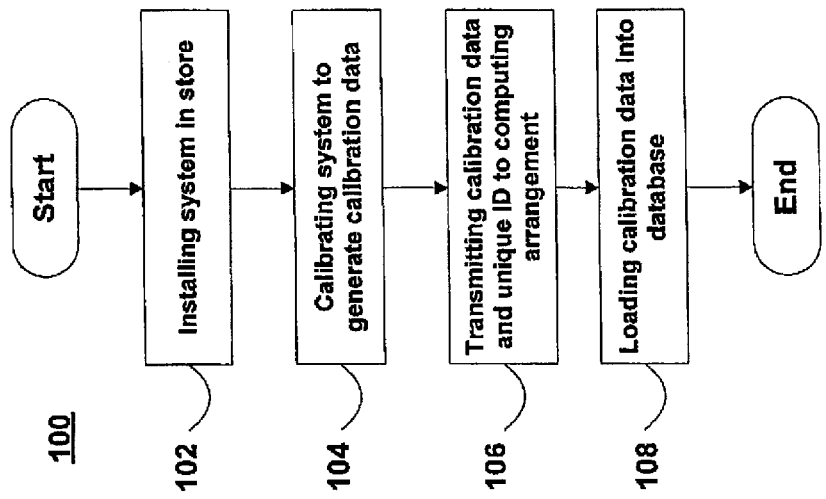
FIG. 2 shows an exemplary embodiment of a method for calibration of the system according to the present invention.

A method according to the present invention includes a calibration method 100 and a utilization method 200. The calibration method 100, shown in FIG. 2, begins with installing the first and second devices 22, 24 on the shelf 20 in the store 12. As described above, the first and second devices 22, 24 may be situated next to each other or at different locations along the perimeter of the shelf 20. In particular, the first and second devices 22, 24 situated in a close proximity to the surface 18 of the shelf 20 in such a manner that the first device 22 is capable to transmit the wave along the surface 18.

In step 104, the system 1 is calibrated to generate calibration data. The calibration data includes a plurality predetermined calibration condition states and a corresponding calibration value. The predetermined calibration condition state corresponds to a degree of the surface 18 is occupied by the items 16 during the calibration. For example, one of the calibration condition states is when the shelf 20 is emptied of the items 16. In such a case, the first device 22 then transmits the wave along the surface 18 of the shelf 20, and the transmitted wave is received by the second device 24 without being greatly deflected, etc. As would be understood by those skilled in the art, a plurality of calibration condition states may exist such as where the shelf 20 includes at least one item 16, a full row or a full column of items 16, a certain percentage of items 16, a completely stocked shelf 20, etc.

The received wave has certain properties (e.g., amplitude, phase, etc.) which correspond to the wave traveling along the surface 18 of the shelf 20 composed of a certain material (e.g., plastic, ceramic, etc.) in a particular condition state (e.g., empty, 30% full, 100% full, etc.). The calibration value may be determined as based on the known properties of the transmitted wave and the properties of the received wave. The calibration value may also be determined based on an n-dimensional vector consisting of inputs from multiple first and second devices 22, 24.

As shown by step 106, the calibration data may be transmitted to the computing arrangement 28 via the communications network 26. The calibration data may be transmitted along with a unique identifier ("ID"), which may incorporate a shelf number, a store identity, and/or any other identifying characteristics. For example, the computing arrangement 28 may be operating for several stores. Thus, the unique ID allows the computing arrangement 28 to segregate and store the first data set for any number of stores. In step 108, the calibration data is stored in the database 30 for future access.

Figure 3:
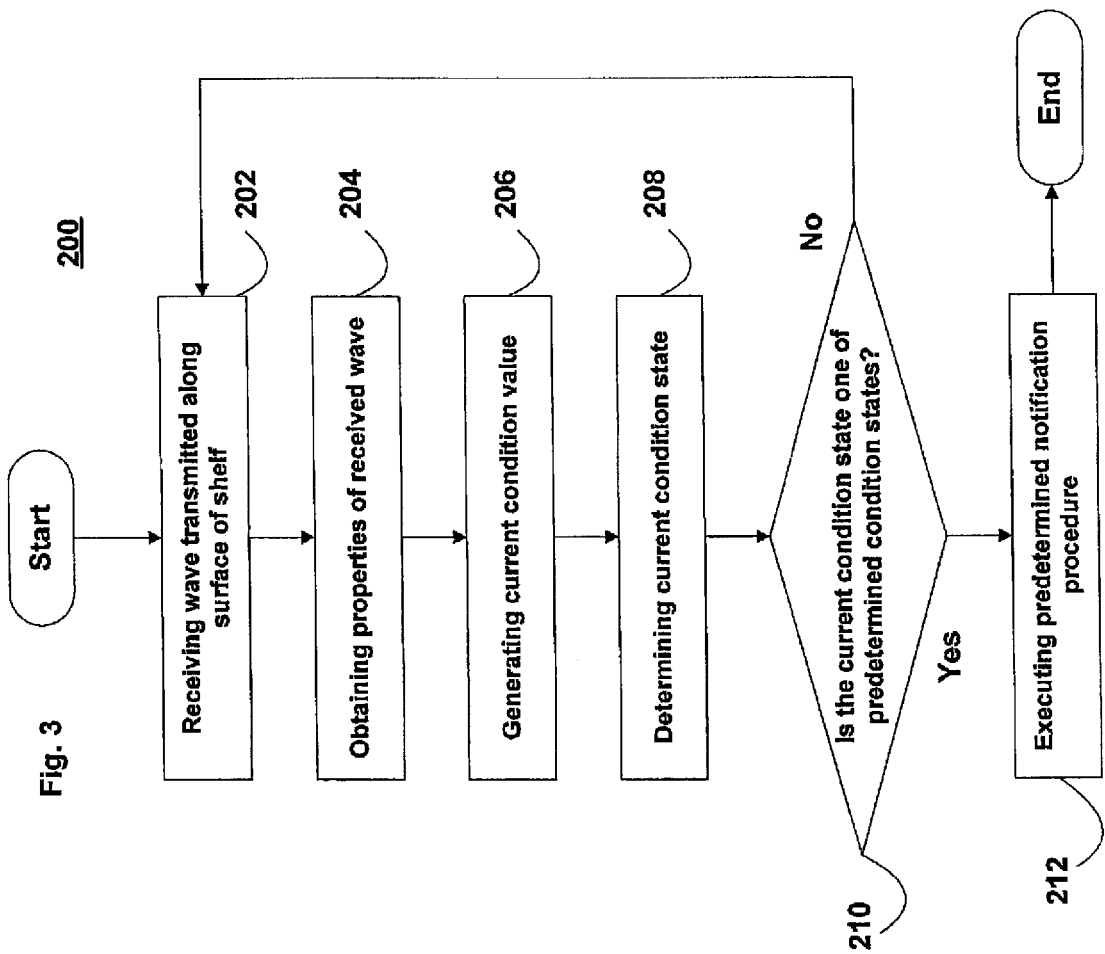
FIG. 3 shows an exemplary embodiment of the method for utilization of the system according to the present invention.

After the installation and calibration, the system 1 may proceed with a utilization method 200, as seen in FIG. 3. In step 202, the second device 24 receives the wave transmitted by the first device 22. The received wave may be attenuated, reflected and/or refracted based on the number and location of items 16 that remain on the shelf 20. As would be understood by those skilled in the art, the wave may be transmitted by the first device 22 on a continuous or periodic basis. For example, the wave may be sent continuously when the store 12 is open and may be discontinued when the store 12 is closed. Alternatively, the wave may be transmitted according to certain time periods (e.g., every five minutes, every hour).

In step 204, proprieties of the received wave and, optionally, the unique ID of the shelf 20, are transmitted by the second device 24 to the computing arrangement 28. As described above, the properties of the received wave may include its magnitude and time references.

In step 206, the computing arrangement 28 generates a current condition value based on the known properties of the transmitted wave and the properties of the received wave. The calibration value may also be calculated from an n-dimensional vector consisting of inputs from multiple first and second devices 22, 24. The step of determining the current condition value may be substantially similar to the step of determining the calibration value.

Subsequently, the current condition state is determined based on the current condition value and the calibration data (step 208). The current condition state may correspond to a degree of the surface 18 currently occupied by the items 16. The current condition state closely corresponds to one of the calibration condition states which are indicative of a plurality of conditions in which a predetermined amount of the items 16 on the shelf 20. For example, the current condition state may indicate that the shelf 20 is empty.

In step 210, the computing arrangement 28 determines if the current condition state is one of predetermined condition states or if there is a change in the current condition state. The change in the current condition state may indicate, e.g., that the shelf 20 became empty, that the shelf 20 was not restocked and the items 16 were misplaced or that there is an increase in the rate of sales of the items 20. For example, the predetermined condition state may be set at 90% fullness of the shelf 20. The shelf 20 must be restocked when 10% of the shelf 20 is empty. In another example, the predetermined condition state may be set at 70% which may signal that an order for the items 16 should be placed If the current condition state is one of the predetermined condition states, the computing arrangement 28 may execute a corresponding notification procedure (step 212). As would be understood by those skilled in the art, the predetermined notification procedure may be customized for the store 12, the item 16 and/or manufacturer of the item 16. For example, the computing arrangement 28 may send a first message providing a notice to the storage 14 that the shelf 20 needs to be restocked. Then, a second message is sent to the store 12 notifying it that the shelf 20 is partially or completely empty, and that the first message has been sent to the storage 14. The computing arrangement 28 may send a third message to an indicator (e.g., LED) on the shelf 20. In addition, a fourth message may be sent to both the store 12 and the storage 14 indicating that the item 16 may need to be reordered.

In a further embodiment of the present invention, the system 1 may include a liner (not shown) which is placed on the surface 18 of the shelf 20 and the items 16 are placed on the liner. The liner may be composed of a material with known acoustic properties, thus allowing the wave to propagate in a known manner along a surface of the liner. Therefore, the liner allows for a more accurate calibration and, in turn, more accurate readings and assessment of shelf conditions. In addition, the liner may simplify the installation procedure where the user would have to determine the acoustical properties of the shelf 12 in order to obtain accurate calibration data.

In a further exemplary embodiment, the system 1 may include a wave reflector (not shown). The wave reflector may utilized where the devices 22, 24 are satiated next to each other (e.g., as shown in FIG. 4). In such a case, the wave is transmitted by the device 22 and then reflected by the wave reflector. The reflected wave is then received by the device 24.

The present invention has been described with the reference to the first and second devices 22, 24 and the computing arrangement 28. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

The invention claimed is:

1. A system, comprising:
a first arrangement including a transmitter and a receiver, the transmitter transmitting an ultrasonic wave along a surface on which items are to be stored, the receiver receiving the wave after it has passed over the surface; and
a second arrangement receiving from the first arrangement data corresponding to properties of the received wave, the second arrangement comparing the properties of the received wave to properties of the transmitted wave to determine a degree of the surface currently occupied by the items, wherein the second arrangement generates a current condition value, and the second arrangement determines the degree of the surface currently occupied by the items based on the current condition value and calibration data, the calibration data including at least one calibration value and a corresponding calibration condition state.

2. The system according to claim 1, wherein the properties of the transmitted wave are received by the second arrangement from the transmitter.

3. The system according to claim 1, wherein the properties of the transmitted wave are stored in the second arrangement.

4. The system according to claim 1, further comprising:
a wave reflection positioned so that waves leaving the transmitter are propagated across the surface to the receiver.

5. The system according to claim 1, wherein the transmitter and the receiver are mounted adjacent to one another.

6. The system according to claim 1, wherein the transmitter is Situated at a first end of the surface and the receiver is situated at a second end of the surface, the first end being opposite to the second end.

7. The system according to claim 1, wherein the calibration data includes a plurality of calibration values and corresponding calibration condition states, each of the calibration condition states corresponds to a predetermined degree of occupancy of the surface by items stored thereon.

8. The system according to claim 1, wherein the calibration condition state is one of (i) the surface is completely free from the items, (ii) the surface is partially free from the items and (iii) the surface is completely filled with the items.

9. The system according to claim 1, wherein the system includes a plurality of the first arrangement located around at least a portion of the surface.

10. The system according to claim 9, wherein the current condition value is calculated as a function of an n-dimensional vector, the vector determined as a function of the properties of the received wave from the plurality of the first arrangements.

11. The system according to claim 1, wherein the surface is on a shelf in a store.

12. The system according to claim 1, wherein the first and second arrangement communicate via a communications network.

13. The system according to claim 1, wherein the properties of the received wave include at least one of amplitude, phase, spectrum and time references.

14. The system according to claim 1, further comprising:
a liner situated on the surface, the liner having predetermined acoustical properties.

15. The system according to claim 1, wherein the current condition value is transmitted along with a unique identifier identifying the surface.

16. The system according to claim 1, wherein the wave is transmitted every predetermined time period.

17. The system according to claim 1, wherein the transmitter sends one of a single frequency wave and a broad frequency spectrum of waves to measure a impulse response function of the surface.

18. The system according to claim 1, wherein the current condition value is a function of the wave coming into contact with all items stored on the surface.

19. A method, comprising:
transmitting an ultrasonic wave along a surface on which items are to be stored;
receiving the wave after it has passed over the surface;
determining data corresponding to properties of the received wave;
comparing the properties of the received wave with properties of the transmitted wave to determine a degree of the surface currently occupied by the items; and
generating a current condition value, wherein the degree of the surface currently occupied by the items is determined based on the current condition value and calibration data, the calibration data including at least one calibration value and a corresponding calibration condition state.

20. The method according to claim 19 wherein the properties include one of at least an amplitude, a phase, an attenuation, a wavelength, and a frequency.

21. The method according to claim 19, wherein the current condition value is a function of the wave coming into contact with all items stored on the surface.

* * * * *

UNITED STATES PATENT AND TRADEMARK OFFICE
CERTIFICATE OF CORRECTION

PATENT NO. : 7,561,492 B2
APPLICATION NO. : 11/759478
DATED : July 14, 2009
INVENTOR(S) : Willins et al.

It is certified that error appears in the above-identified patent and that said Letters Patent is hereby corrected as shown below:

Column 4, Line 24, delete "placed" and insert -- placed. --, therefor.

Column 5, Line 26, in Claim 4, delete "reflection" and insert -- reflector --, therefor.

Column 5, Line 32, in Claim 6, delete "Situated" and insert -- situated --, therefor.

Signed and Sealed this

Sixteenth Day of February, 2010

David J. Kappos
*Director of the United States Patent and Trademark Office*